United States Patent
Yang

(10) Patent No.: US 9,911,414 B1
(45) Date of Patent: Mar. 6, 2018

(54) TRANSIENT SOUND EVENT DETECTION

(71) Applicant: Amazon Technologies, Inc., Seattle, WA (US)

(72) Inventor: Jun Yang, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 579 days.

(21) Appl. No.: 14/136,923

(22) Filed: Dec. 20, 2013

(51) Int. Cl.
*G10L 17/00* (2013.01)
*G10L 15/22* (2006.01)

(52) U.S. Cl.
CPC .................. *G10L 15/22* (2013.01)

(58) Field of Classification Search
CPC ... G10L 21/0364; G10L 19/005; G10L 15/26; G10L 15/1815; G10L 15/19; G10L 15/20; G10L 15/30; G10L 19/09; G10L 19/097; G10L 19/26; G10L 25/90
USPC ......... 704/203, 205–215, 219–230, 500–504
See application file for complete search history.

(56) References Cited

U.S. PATENT DOCUMENTS

| 7,418,392 B1 | 8/2008 | Mozer et al. |
| 7,720,683 B1 | 5/2010 | Vermeulen et al. |
| 7,774,204 B2 | 8/2010 | Mozer et al. |
| 2002/0095284 A1* | 7/2002 | Gao ..................... G10L 21/0364 704/219 |
| 2009/0281797 A1* | 11/2009 | Zopf ..................... G10L 19/005 704/207 |
| 2012/0223885 A1 | 9/2012 | Perez |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

\* cited by examiner

*Primary Examiner* — Huyen Vo
(74) *Attorney, Agent, or Firm* — Lee & Hayes, PLLC

(57) ABSTRACT

Techniques are described for detecting and/or validating audible taps, double-taps, or other tapped audio sequences generated by a user. A predicted voice signal is subtracted from an audio signal to produce a prediction error signal. The prediction error signal is analyzed in terms of dynamics and periodicity to determine whether it contains an audio pulse. In certain cases, prediction error signals corresponding to multiple microphones are analyzed to determine position information regarding the individual taps of a double-tap. A double-tap is validated and acted upon when the individual taps originate from the same location and the taps occur within a given time period.

21 Claims, 7 Drawing Sheets

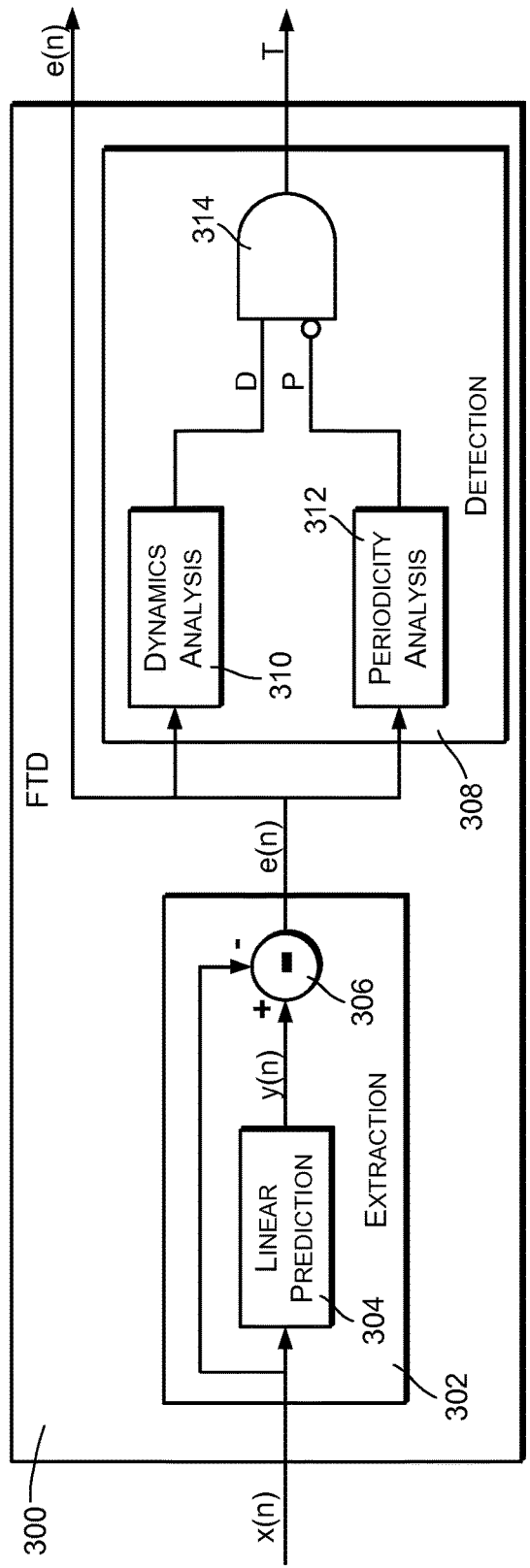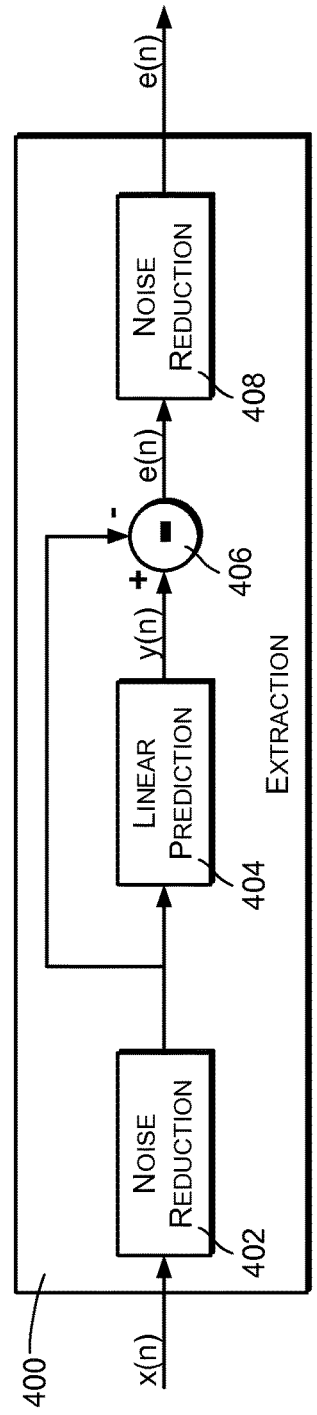
FIG. 3
FIG. 4

TRANSIENT SOUND EVENT DETECTION

BACKGROUND

User interfaces have traditionally relied on input devices such as keyboards, which require physical manipulation by a user. Increasingly, however, it is desired to detect and monitor the physical positions and movements of users within a scene or environment, and to respond to more natural user actions.

Speech recognition may be used in some situations for recognizing user commands. However, it may sometimes be desired to reliably detect or recognize other types of sounds, which may be non-verbal, and to respond to such sounds. In particular, some types of devices may respond to user-generated taps or double-taps, such as knocking on a surface, snapping the fingers of a hand, or clapping two hands together.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a block diagram of an example fast-transient detector (FTD) that can be used to detect audible taps. The example FTD contains an extraction component and a detection component.

FIG. 4 is a block diagram of an alternative extraction component that may be used in some embodiments.

DETAILED DESCRIPTION

Figure 1:
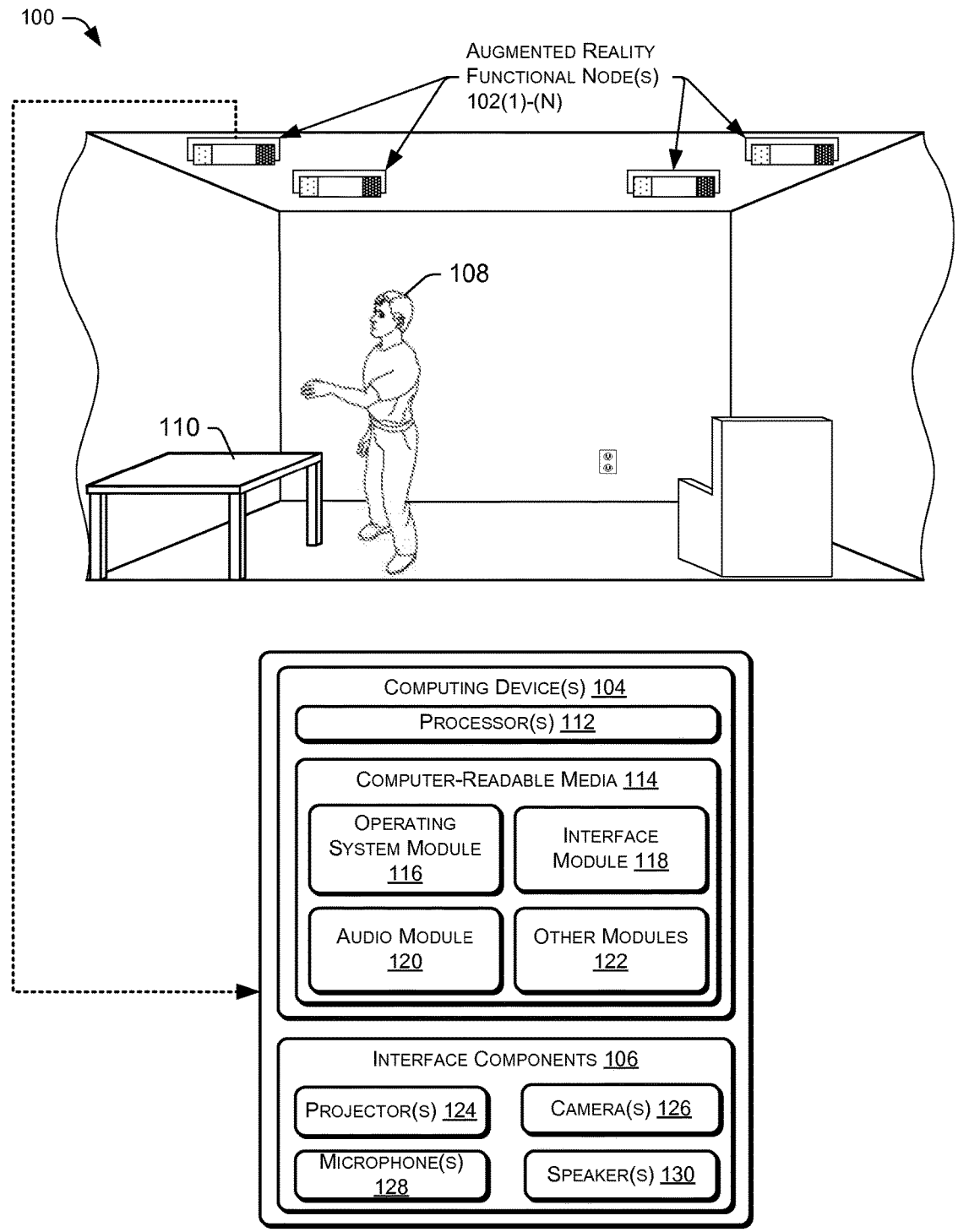
FIG. 1 illustrates an environment that includes an augmented reality functional node (ARFN) that monitors and responds to user activities such as audible taps.

Described below are systems and techniques that recognize and respond to audible taps made by a user. An audible tap is a sound that is produced when a user knocks on a surface such as a wall or table, for example. An audible tap may also be produced by clapping two hands together, by snapping fingers, by tapping one object against another, or by any other means. The methods may also be used to detect and validate double-taps and other multiple tap sequences having regular or irregular rhythms. Furthermore, the techniques may in some cases be used for detecting sequences of other types of sounds, including vocal sounds.

In an example implementation, linear prediction coding is applied to a microphone audio signal to produce a predicted voice signal, representing predicted voice components of the audio signal. The predicted voice signal is then subtracted from the original audio signal to produce a prediction error signal from which voice components have been largely removed. Audio components corresponding to audible taps are likely to be present in the prediction error signal.

The prediction error signal may be analyzed to identify audible taps and other fast transient events. As an example, the prediction error signal may be analyzed to determine its dynamic range and its degree of periodicity. When the prediction error signal exhibits a high dynamic range and low periodicity, it is deemed to signal the occurrence of an audible tap. Double-taps may be detected by detecting the occurrences of sequential audible taps.

A system may respond to an audible tap or double-tap by taking a corresponding action. A system may turn on a light, for example, in response to a validated double-tap. As another example, a user may double-tap a surface to instruct a system to project a visible display onto the surface.

Prediction error signals corresponding to multiple microphones within an environment may be further analyzed to determine locations from which detected audible taps have originated. A detected audible tap may be invalidated when it is found to have originated from a location very close to the microphones or very far from the microphones. Sounds that originate from locations very close to the microphones are likely to have been generated by noise sources other than user. Sounds that are found to have originated from locations at very large distances from the microphones may represent echoes or background noise.

The locations of first and second audible taps of a double-tap may also be determined and compared. When the first and second audible taps of an otherwise detected double-tap do not originate from a common location, the double-tap can be invalidated and/or ignored. Non-validated or invalidated double-taps may result, for example, from random or coincidental taps that occur from different locations. In some cases, invalid double-taps may be purposely generated by a user by deliberately tapping on a surface after a different user has performed a single tap. When the time difference between first and second audible taps is either too large (say, above 464 ms) or too small (say, below 144 ms), the double-tap can be invalidated and/or ignored.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices. Furthermore, ARFNs or other devices may have different configurations and form factors. For example, ARFNs may be implemented as free-standing units that are placed on tables or integrated with household furniture and/or appliances.

As illustrated, each ARFN 102 may include one or more computing devices 104, as well as one or more interface components 106. The computing devices 104 and interface components 106 may be configured in conjunction with each other to interact with a user 108 within the environment 100. As an example, the user 108 may double-tap a table 110 within the environment, and the ARFN 102 may respond in any manner, such as by projecting content on the surface of the table 110, such as an interactive menu, a video, a book, an image, or any other sort of visual content. In some environments, the ARFN 102 may be configured to detect or identify the surface upon which the double-tap was made, and to project the content onto that surface.

As illustrated, the computing device 104 of the example ARFN 102 may include one or more processors 112 and computer-readable media 114. The processor(s) 112 may be configured to execute computer-executable instructions, which may be stored in the computer-readable media 114 or in other computer-readable media accessible to the processor(s) 112. The processor(s) 112 may include digital signal processors (DSPs), which may be used to process audio signals in accordance with the techniques described herein.

The computer-readable media 114 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 114 may reside within a housing of the ARFN, on one or more storage devices accessible on a local network, on cloud storage accessible via a wide area network, or in any other accessible location.

The computer-readable media 114 may store various modules, such as instructions, datastores, and so forth that are configured to execute on the processors 112. For instance, the computer-readable media 114 may store an operating system module 116 and an interface module 118. The operating system module 116 may be configured to manage hardware and services within and coupled to the computing device 104 for the benefit of other modules. The interface module 118 may be configured to receive and interpret commands received from users within the environment 100, and to respond to such commands in various ways as determined by the particular environment.

The computer-readable media 114 may also include an audio module 120 that is executable to perform audio processing. In particular, the audio module 120 may implement the techniques described below for detecting and validating audible tap events.

The computer-readable media 114 may contain other modules 122, which may be configured to implement various different functionality of the ARFN 102.

The ARFN 102 may include various interface components 106, such as user interface components and other components that may be used to detect and evaluate conditions and events within the environment 100. As examples, the interface components 106 may include one or more projectors 124, one or more cameras 126, multiple microphones 128, and one or more speakers 130. The interface components 106 may in certain implementations include various other types of sensors and transducers, content generation devices, and so forth.

The projector(s) 124 may be used to project content onto surfaces of the environment 100 for viewing by the user 108. In addition, the projector(s) 124 may project patterns, such as non-visible infrared patterns, that can be detected by the camera(s) 126 and used for 3D reconstruction and modeling of the environment 100. The camera(s) 126 may be used for various purposes, such as determining the location of the user 108, detecting user gestures, determining the positions of objects within the environment 100, reconstructing 3D characteristics objects within the environment 100, and so forth.

The microphones 128 may be disposed within a chassis of the ARFN 102 or elsewhere within the environment 100. The microphones 128 may be used to acquire input from the user 108, may be used to determine the location of a sound, and/or may be used to otherwise aid in the characterization of and receipt of input from the environment 100. For example, the user may make particular noises, such as a tap on a wall or snap of the fingers, which are pre-designated as attention command inputs or audio events. Such audio inputs may be located within the scene using time-of-arrival differences among the microphones. The microphones may be spaced from each other in two or three dimensions to facilitate time-of-arrival analyses.

The speaker(s) 130 may be used by the ARFN 102 to provide audible output. For example, the speaker(s) 130 may be used to provide output from a text-to-speech module or to playback pre-recorded audio.

The coupling between the computing device 104 and the interface components 106 devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within a projector or camera. Therefore, it is to be appreciated that the illustration of the ARFN 102 of FIG. 1 is for illustrative purposes only, and that components of the ARFN 102 may be configured in any other combination and at any other location.

Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

In other implementations, the components of the ARFN 102 may be distributed in one or more locations within the environment 100. For example, the microphones 128 and speaker(s) 130 may be distributed throughout the environment. The projector(s) 124 and the camera(s) 126 may also be located in separate chasses. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 2:
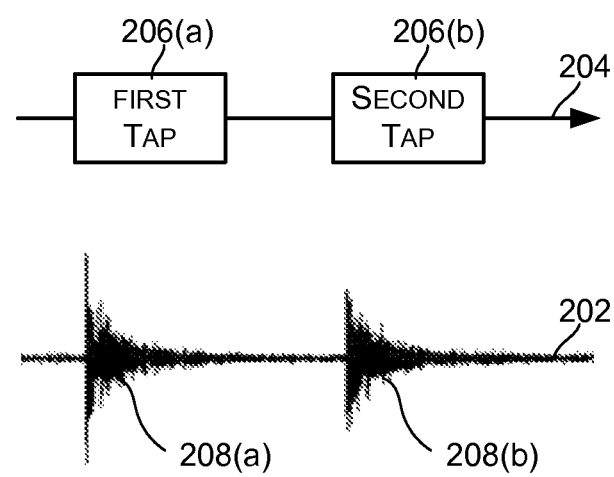
FIG. 2 illustrates an audio double-tap and associated audio signal.

FIG. 2 illustrates an example of an audio signal 202 containing an audio event sequence, which in this case comprises an audio double-tap. The audio module 120 may be configured to detect the audio event sequence and its individual events in accordance with techniques described below.

In FIG. 2, a timeline 204 indicates times at which a first tap 206(a) and a second tap 206(b) of the double-tap occur. The audio signal 202 has a first portion 208(a) that corresponds in time to the first tap 206(a) and a second portion 208(b) that corresponds in time to the second tap 206(b). The signal portions 208(a) and 208(b) are characterized as being relatively short, separated pulses having fast rise times and long decay times, consistent with characteristics of signals representing audible taps. Portions 208(a) and 208(b) may be referred to as pulses or tap pulses in the following discussion.

FIG. 3 illustrates an example signal processing configuration and technique that may be used in a system or device to detect an audio event such as one of the audible taps 206 of FIG. 2. In the following discussion, audio signals and other signals are represented as digital signals, comprising continuous sequences of digital signal values that are sometimes referred to as samples. For example, audio received from the microphone 128 may be evaluated in the time domain at a predetermined sampling rate $f_s$ (such as 16 kHz, for example) to produce sampled signal values x(n), x(n+1), x(n+2), . . . . The nomenclature "x(n)" indicates the $n^{th}$ value of a sequence x of digital signal values.

In the embodiment described herein, the various digital signals may be arranged and operated on in blocks of sequential signal values, where each block contains a number N (N=128 or N=256, as examples) of the signal values.

FIG. 3 shows an example of a fast transient detector (FTD) 300 that is configured to detect audio events having the characteristics of audible taps as shown in FIG. 2. The FTD 300 receives an audio signal x(n) that has been produced based on audio received at a microphone 128 of the ARFN 102. The operations represented by the FTD 300 are performed repeatedly with respect to individual blocks of signal values. For purposes of discussion, the FTD 300 is assumed to operate on a block of signal values x(1)-x(N). to produce a true/false value T that indicates whether an audible tap has been found in the block.

Within the FTD 300, the audio signal x(n) is received by an extraction component 302 that analyzes the audio signal x(n) to extract non-voice components of the audio signal x(n). The extraction component 302 comprises a linear prediction component 304 that is configured to produce a predicted voice signal y(n). The linear prediction component 304 uses linear predictive coding, which estimates future values of the audio signal x(n) as a linear function of previous values of the audio signal x(n) to produce the predicted voice signal y(n). In accordance with linear prediction techniques, y(n) may be calculated as follows:

$$y(n) = \sum_{i=1}^{p} a_i x(n-1)$$

where p may be a value such as 10 and $a_i$ represents coefficients that may be obtained using a suitable algorithms such as minimize root mean square, auto-correlation, or the Levinson-Durbin recursion algorithm.

Linear prediction is used to model speech waveforms and therefore effectively filters the microphone signal x(n) to extract voice components of x(n) and to reduce or eliminate non-voice components in the predicted voice signal y(n). Accordingly, fast transient events such as audible taps are largely attenuated or removed in the predicted voice signal y(n).

A subtraction component 306 receives the audio signal x(n) and the predicted voice signal y(n), and subtracts the predicted voice signal y(n) from the audio signal x(n) to produce a linear prediction error signal e(n) (also referred to below as the error signal e(n)). The error signal e(n) primarily represents non-voice components of the audio signal x(n), which may include signal components representing audible taps.

The FTD 300 also comprises a tap detection component 308 that receives the error signal e(n) and that analyzes the error signal e(n) to determine whether an audible tap is represented by or within the error signal e(n). The tap detection component 308 produces a tap signal T, which is a true/false signal indicating whether an audible tap has occurred based on analysis of x(n) and e(n).

The tap detection component 308 comprises a dynamics analysis component 310 that receives the error signal e(n). The dynamics analysis component 310 is configured to determine whether the error signal e(n) exhibits large signal dynamics, which can be interpreted as an indication that the audio signal x(n) may represent an audible tap. The dynamic range may be calculated for a block of e(n) signal values by (a) estimating an envelope value of the audio signal e(n), (b) estimating a floor value of the audio signal e(n), and (c) comparing the envelope value and the floor value. The comparison may comprise calculating the ratio of the envelope value to the floor value, and then comparing the ratio to a threshold (e.g. 2.0). If the ratio is less than the threshold, the error signal e(n) has low or small dynamics. If the ratio is greater than the threshold, the error signal e(n) has high dynamics and the error signal e(n) may be judged as relatively more likely to represent an audible tap.

The envelope value of the audio signal may be obtained by identifying the smoothed upper boundary in the time domain within which the signal is contained. This may be accomplished using a fast attack and slow release filter, or with a lowpass filter having fast tracking as follows:

$$env(n) = |e(n)| + (env(n-1) - |e(n)|) * \alpha$$

where env(n) is the envelope value and α is approximately 0.50.

The floor value of the audio signal may be obtained by identifying the smoothed average signal level in the time domain. This may be accomplished using a slow attack and fast release filter, or with lowpass filter having slow tracking as follows:

$$flr(n) = |e(n)| + (flr(n-1) - |e(n)|) * \beta$$

where flr(n) is the envelope value and β is approximately 0.98.

The dynamics analysis component 310 produces a true/false dynamics signal D indicating whether the error signal e(n) exhibits relatively high dynamics. The dynamics signal D is true if the ratio as calculated above is greater than the threshold (say, 2.0). The dynamics signal D is false if the ratio is less than the threshold.

The tap detection component 308 also comprises a periodicity analysis component 312 that receives the error signal e(n). The periodicity analysis component 312 is configured to determine whether the error signal e(n) is periodic, which can be used as an indication that the audio signal x(n) does not represent an audible tap. Periodicity of a signal, referred to herein as a periodicity level, may be calculated for a block of e(n) signal values (say, N samples) by performing an auto-correlation of the signal.

An autocorrelation may be performed as follows:

$$R(k) = \Sigma[(e(i)-\mu)(e(i+k)-\mu]/(N-k)$$

where the i is from 1 to N−k, the variable k is between 0 and N−1, μ, is the sample mean of e(n) (i.e., μ=(e(0)+e(1)+ . . . +e(N−1))/N).

Auto-correlation yields a correlation value R(k) with k ranging from 0 to N−1. To determine whether the error signal e(n) is periodic, the maximum correlation value R(m) with m between 1 and N−1 is selected, the ratio between R(m) and R(0) (i.e., the maximum normalized autocorrelation) is calculated and compared to a threshold (e.g., 0.50), and the result of the comparison is output as a true/false periodicity signal P. If the ratio R(m)/R(0) exceeds the threshold, the error signal e(n) is said to be periodic and the periodicity signal P is true. Otherwise, if the ratio R(m)/R(0) does not exceed the threshold, the error signal e(n) is said to be non-periodic and the periodicity signal P is false.

A logic component 314 receives the dynamics signal D and the periodicity signal P and in response produces a tap signal T. The tap signal T is true when both (a) the dynamics signal D is true and (b) the periodicity signal P is false. Otherwise, if the dynamics signal D is false or the periodicity signal P is true, the tap signal T is false. The tap signal T thus indicates a condition in which a block of the error signal e(n) has relatively high dynamics and low periodicity. This condition may be used as an indication that the x(n) signal represents an audible tap or similar audio event over the same block of signal values.

FIG. 4 illustrates an alternative extraction component 400 having a configuration that may be used in place of the extraction component 302 of FIG. 3. The alternative extraction component 400 has a first noise reduction component 402 that receives the audio signal x(n) and implements noise reduction techniques to reduce noise elements of the audio signal x(n). Various types of stationary noise reduction techniques can be used for this purpose, including techniques based on adaptive filtering, binary masking, spectral subtraction, etc. The first noise reduction component 402 may be configured to reduce noise such as fan noise, room noise, stationary portions of music, acoustic noise generated by mechanical elements of the ARFN, etc.

The extraction component 400 also has a linear prediction component 404 and a subtraction component 406 that are the same as the linear prediction component 304 and subtraction component 306 described above. The output of the subtraction component 406 is received by a second noise reduction component 408, which is configured to reduce the noise source of unvoiced speech in the error signal e(n). The second noise reduction component 408 can be implemented using various types of stationary noise reduction techniques as described above with reference to the first noise reduction component 402.

Figure 5:
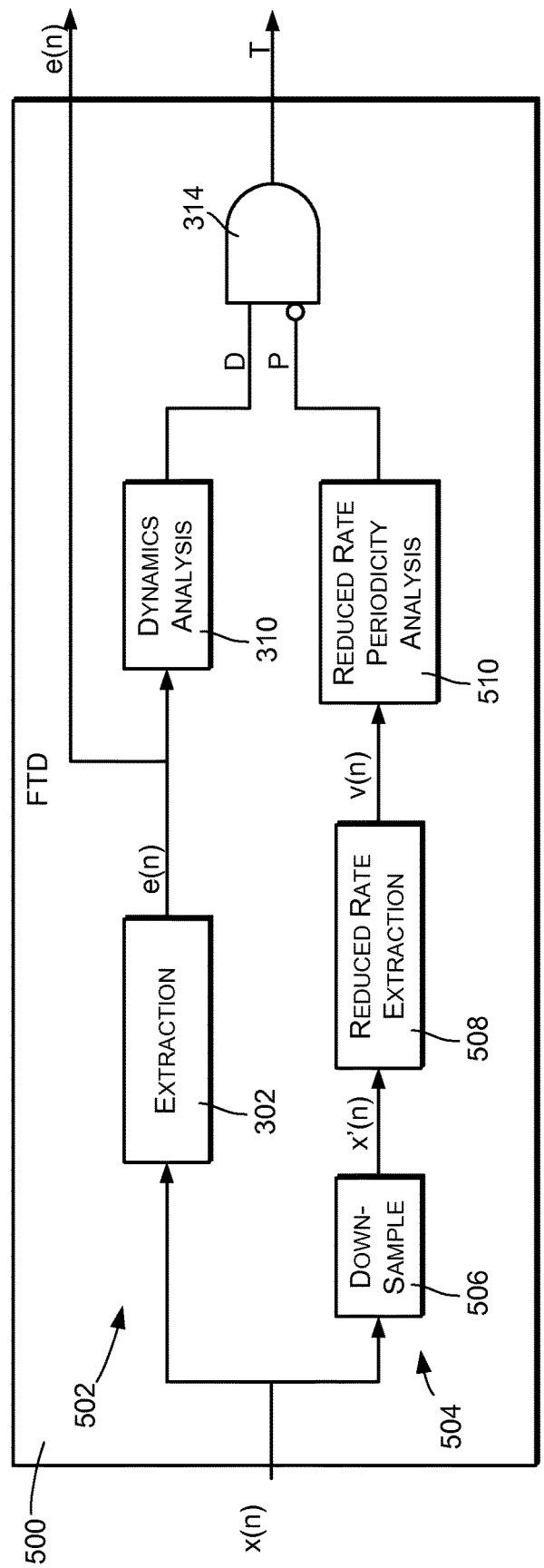
FIG. 5 is a block diagram of an alternative FTD that may be used in some environments.

FIG. 5 shows a alternative fast transient detector (FTD) 500 that receives the audio signal x(n) from a microphone 128 of the ARFN 102 and produces a tap signal T indicating detection of an audible tap in the audio signal x(n). In this example, dynamics and periodicity are evaluated in two processing paths 502 and 504. The first processing path 502 operates at the original sample frequency of the audio signal x(n), such as 16 kHz. The second processing path 504, however, operates at a reduced sample frequency to decrease computational complexities.

The first processing path 502 includes the extraction component 302 and the dynamics analysis component 310 as discussed above, configured as already described to produce the prediction error signal e(n) and the dynamics signal D.

The second processing path 504 has a down-sample component 506 that initially down-samples the audio signal x(n) by a factor such as 8 to produce a down-sampled audio signal x'(n). For example, the audio signal may be down-sampled from 16 kHz to 2 kHz.

The second processing path has a reduced rate extraction component 508 and a reduced rate periodicity analysis component 510, each of which is configured to operate at this lower sample frequency. The reduced rate extraction component 508 operates similarly to the extraction component 302, except that it operates at the reduced sample frequency. The reduced rate periodicity analysis component 510 operates similarly to the periodicity analysis component 312 of FIG. 3, except that it operates at the reduced sample frequency to produce the periodicity signal P.

The FTD 500 includes the logic component 314 that operates as already described to produce the audible tap signal T, indicating whether the audio signal x(n) contains or represents an audible tap. The logic component 314 receives the dynamics signal D and the periodicity signal P and in response produces a true tap signal T when the error signal e(n) has high dynamics and the down-sampled error signal v(n) is not periodic.

Figure 6:
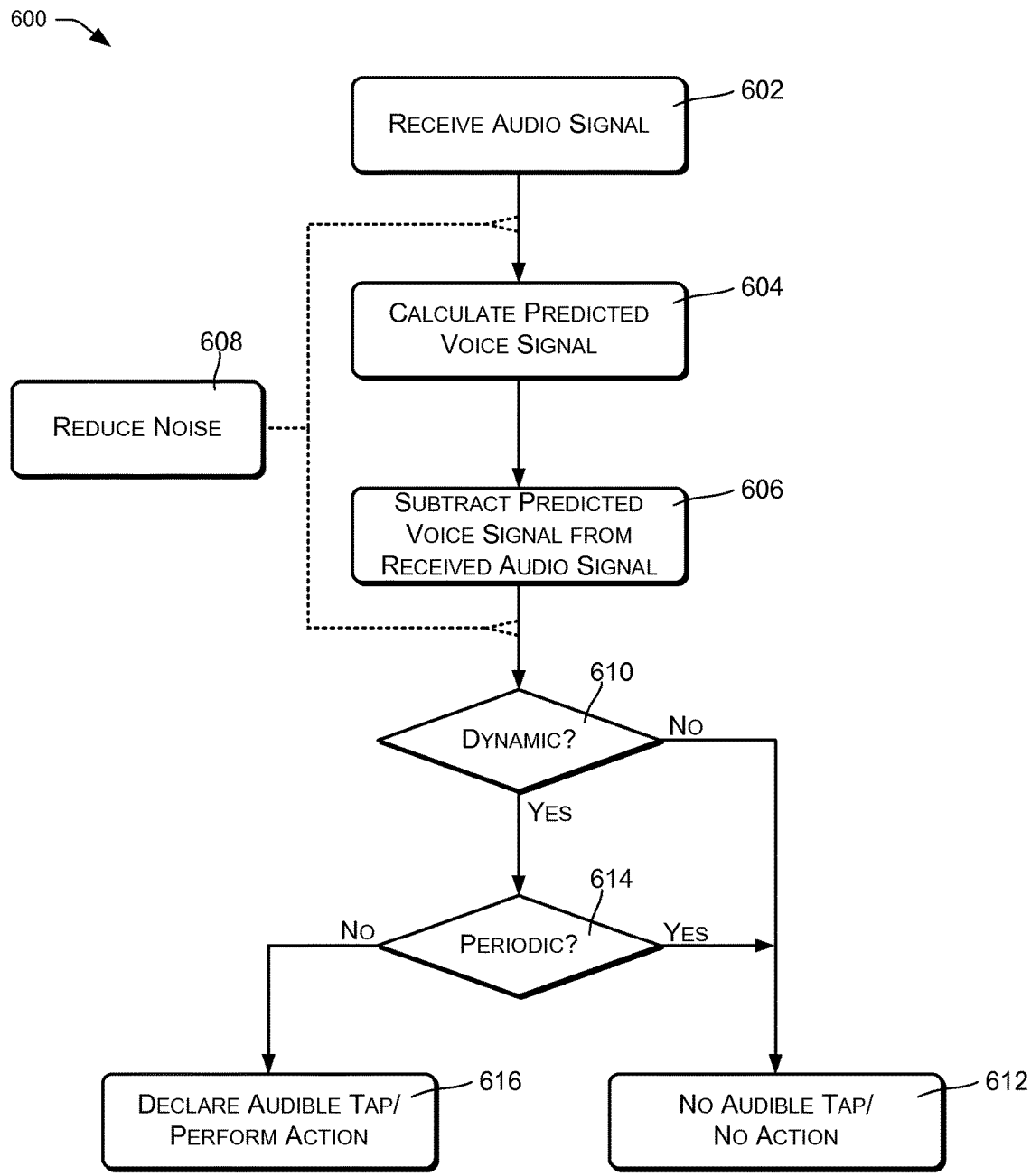
FIG. 6 is a flow diagram illustrating an example method of detecting an audible tap.

FIG. 6 illustrates an example method 600 of detecting an occurrence of an audible tap in an audio signal. An action 602 comprises receiving an audio signal from a microphone such as the microphone 128 of FIG. 1. The audio signal represents sounds occurring within a user environment, which may include human voices, audible taps and other fast transient audio events, and various types of stationary and non-stationary noise. In some cases, the audio signal may contain acoustic noise generated by mechanical elements of the device in which the microphone is located, such as noise from fans, actuators, and so forth.

In some cases, the audio signal may be one of multiple audio signals produced by an array of microphones, and the actions of FIG. 6 might be performed independently with respect to each of the audio signals to detect one or more audible taps.

An action 604 comprises calculating a predicted voice signal, such as by estimating future values of the audio signal as a linear function of previous values of the audio signal. Linear predictive coding may be used for estimating the predicted voice signal.

An action 606 comprises subtracting the predicted voice signal from the received audio signal to produce a predicted error signal. The predicted error signal primarily represents non-voice audio from the user environment, including any potential audible taps.

An action 608 of noise reduction may be performed in some embodiments to reduce certain types of noise that may otherwise be present in the audio signal and/or the predicted error signal. The action 608 may be performed after the action 602 of receiving the audio signal and before the action 604 of calculating the predicted voice signal. The action 608 may also, or alternatively, be performed after the action 606 of subtracting the predicted voice signal from the received audio signal. The action 608 may comprise processing the audio signal and/or the prediction error signal to reduce environment noise and noise generated within the ARFN 102.

An action 610 comprises determining whether the prediction error signal is relatively dynamic. This may comprise determining or calculating a dynamic range or value of the prediction error signal. The dynamic range of the prediction error signal may be determined by comparing a envelope value and a floor value of the prediction error signal. The dynamic range determined in this manner may be compared to a threshold to determine whether the prediction error signal contains relatively high dynamics. If the dynamic range exceeds the threshold, the prediction error signal is found to exhibit relatively high dynamics, which is a condition that suggests presence of an audible tap. If the dynamic range does not exceed the threshold, the prediction error signal is found to exhibit relatively low dynamics, suggesting the absence of an audible tap.

If the dynamic range is low, an action 612 is performed, comprising refraining from declaring or detecting an audible tap and taking no further action. If the dynamic range is high, an action 614 is performed. The action 614 comprises determining whether the prediction error signal is relatively periodic. A periodicity level of the prediction error signal can be determined by performing an auto-correlation of the prediction error signal. This results in an auto-correlation value which is used as the periodicity level, i.e., the maximum normalized autocorrelation. The periodicity level determined in this manner may be compared to a threshold to determine whether the prediction error signal is relatively periodic. If the periodicity level does not exceed the threshold, the prediction error signal is found to be non-periodic, which is a condition suggestive of an audible tap. If the periodicity level does exceed the threshold, the prediction error signal is found to be periodic, which does not suggest occurrence of an audible tap.

If the periodicity level is high, the action 612 is performed, comprising refraining from declaring or detecting an audible tap and taking no further action. Otherwise, if the periodicity level is low, an action 616 is performed of declaring that an audible tap has occurred and responding as may be appropriate to the occurrence of the audible tap. For example, the ARFN 102 may take some action in response to a detected audible tap.

In some embodiments, the actions 610 and 614 may be performed with respect to signals having different sample rates. For example, the action 610 of determining dynamic range may be performed at a first sample rate, which may be equal to the sample rate of the received microphone audio signal. The action 614 of determining periodicity may be performed at a second, lower sample rate, after downsampling the received microphone audio signal.

Figure 7:
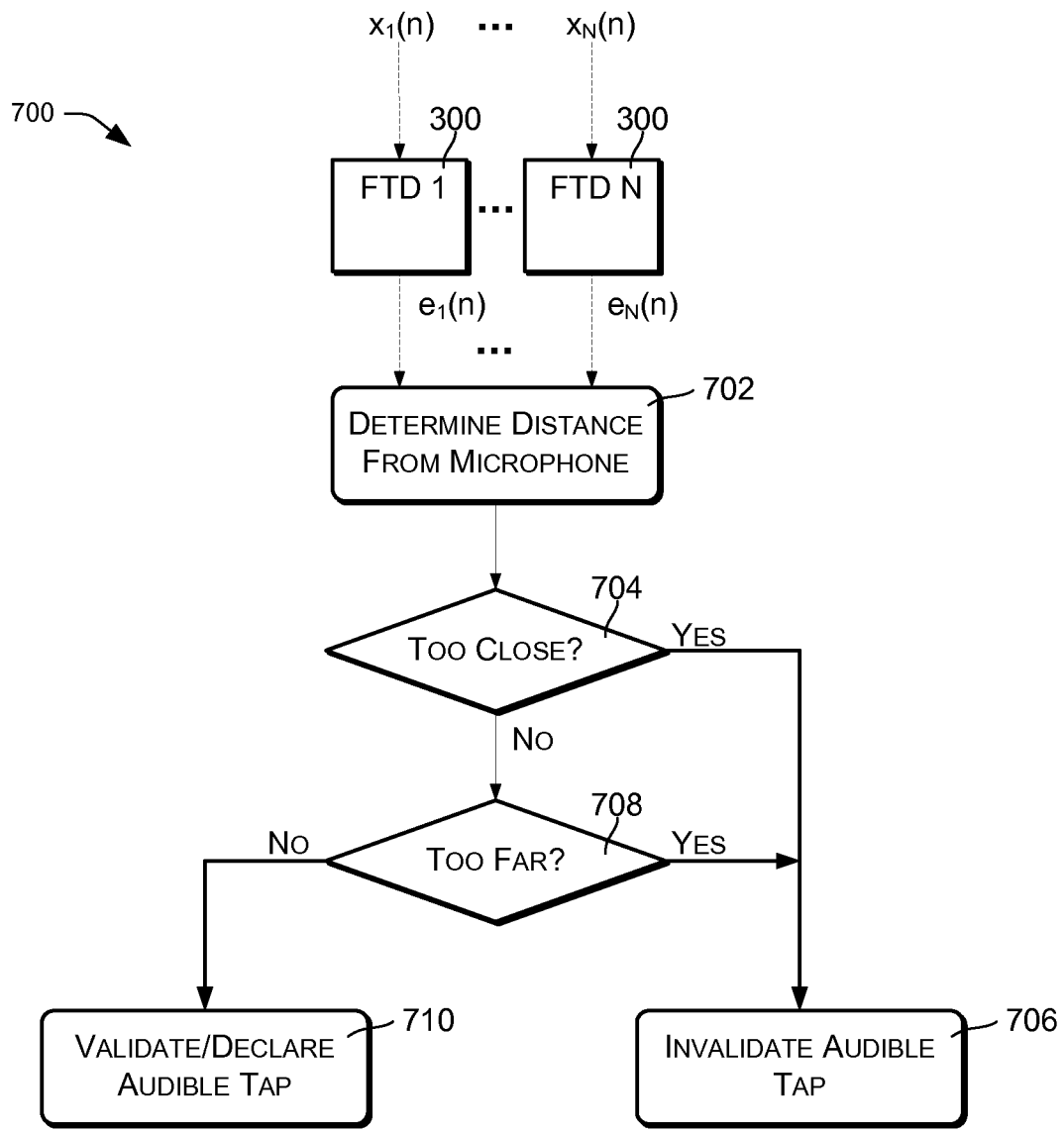
FIG. 7 is a flow diagram illustrating an example method of validating and/or invalidating audible taps based on their source locations.

FIG. 7 illustrates an example method 700 that may be performed in some embodiments in order to further determine and/or validate an occurrence of an audible tap in an audio signal. The method 700 may be performed in conjunction with the actions described above with reference to FIG. 6. Specifically, the method 700 may be performed as part of or in place of the action 616 of FIG. 6, as a further process to confirm the validity of an otherwise detected audible tap.

The method 700 assumes that multiple FTDs 1-N have been used in parallel to analyze multiple audio signals $x_1(n)$-$x_N(n)$ from multiple corresponding microphones 128, and that at least one of the FTDs 300 has produced a positive or logically true tap signal T. The FTDs 300 produce prediction error signals $e_1(n)$-$e_N(n)$ that correspond respectively to each of the microphones 128 and to each of the audio signals $x_1(n)$-$x_N(n)$. The microphones 128 may be arranged in a known spatial configuration so that they may be used for sound localization in conjunction with audio time-difference-of-arrival (TDOA) techniques. The microphones may be spaced or offset from each other in one, two, or three dimensions.

An action 702 comprises determining the source location of the audible tap and the distance of the source location from the ARFN 102 and/or the microphones 128 of the ARFN 102. This action may be performed using various TDOA techniques in conjunction with the prediction error signals $e_1(n)$-$e_N(n)$. For example, time delays between an audible tap arriving at different microphones may be estimated by cross-correlating the prediction error signals $e_1(n)$-$e_N(n)$ or by phase transform approaches based on the prediction error signals $e_1(n)$-$e_N(n)$. Based on the time delays, sound source localization with respect to a detected audible tap can be performed by spherical interpolation or Brandstein-Adcock-Silverman algorithms. Note that the TDOA techniques are applied to the prediction error signals $e_1(n)$-$e_N(n)$ rather than the microphone audio signals $x_1(n)$-$x_N(n)$.

An action 704 comprises determining whether the audible tap originated from a location that is judged to be too close to the ARFN 102 or the microphones 128 of the ARFN 102. Sound sources that are relatively close to the ARFN 102 are likely to comprise elements that are within or part of the ARFN 102 itself, such as fans and actuators. Furthermore, such sources are relatively unlikely to correspond to user-generated audible taps.

The action 704 may be performed by comparing the distance of the audible tap to a predefined threshold difference. If the action 704 determines that the detected audible tap originated relatively close to the ARFN 102 and/or its microphones 128, or did not originate from at least a predefined distance from the ARFN 102 and/or its microphones 128, an action 706 is performed of refraining from declaring an occurrence of an audible tap or invalidating an otherwise declared (by the method 600 of FIG. 6) audible tap.

If the action 706 determines that the audible tap did not originate from a source relatively close to the ARFN 102 and/or its microphones 128, an action 708 is performed of determining whether the audible tap originated from a location that is judged to be too far from the ARFN 102 or its microphones 128. Sound sources that are very far from the ARFN 102 may comprise environmental noise or echoes that should be ignored.

The action 708 may be performed by comparing the distance of the audible tap location from the ARFN 102 to a threshold. If the action 708 determines that the audible tap did not originated too far from the ARFN 102 and/or its microphones 128, an action 710 is performed of validating and/or declaring an occurrence of an audible tap, and taking any further actions that may be appropriate in response to an audible tap. Otherwise, if the audible tap occurred within the threshold distance from the ARFN 102, the audible tap is invalidated in the action 706 and no further action is taken with respect to the audible tap.

Figure 8:
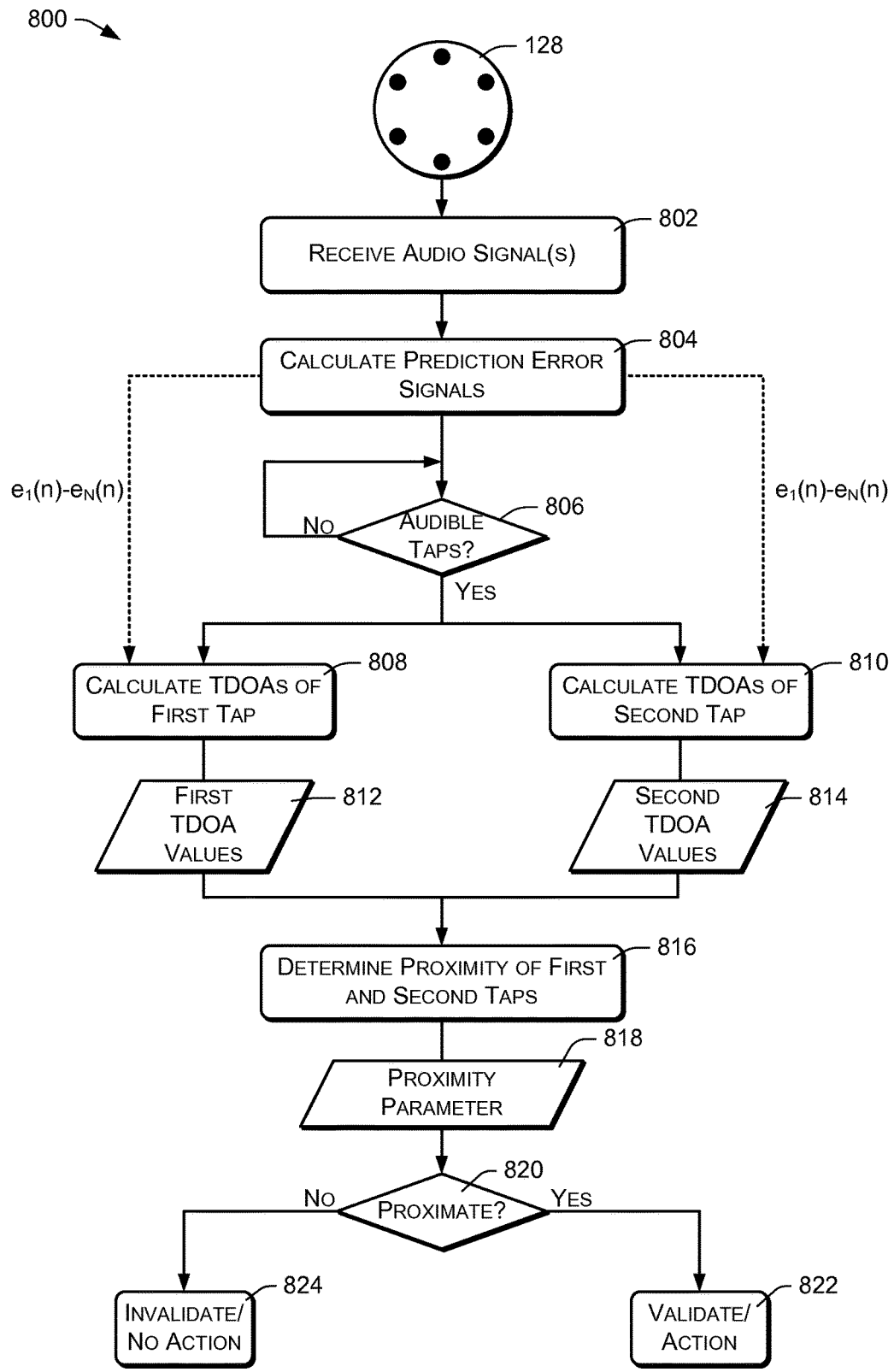
FIG. 8 is a flow diagram illustrating an example method of detecting and/or validating double-taps.

FIG. 8 illustrates a method 800 of detecting and validating double-tap events based on time-difference-of-arrival (TDOA) techniques, in conjunction with the techniques already described above. In this implementation, TDOA values are calculated to indicate the locations of two or more detected audible taps. Taps originating from a common location are validated, while taps that do not originate from a common location are not validated. In addition, taps that do not occur within a given time period are not validated. For example, when the time difference between the occurrences of first and second audible taps is either too large (say, above 464 ms) or too small (say, below 144 ms), the double-tap can be invalidated and/or ignored.

A system may respond to a validated double-tap by taking some action, while non-validated double-taps may be ignored. The locations of the taps are determined by analyzing prediction error signals such as described above, which have been produced using linear prediction techniques.

An action 802 comprises receiving audio signals from multiple microphones 128. The microphones 128 may be arranged in a known spatial configuration so that they may be used for sound localization in conjunction with audio TDOA techniques. The microphones may be spaced or offset from each other in one, two, or three dimensions.

An action 804 comprises calculating prediction error signals $e_1(n)$-$e_N(n)$ corresponding respectively to input signals $x_1(n)$-$x_N(n)$, which are in turn received from respective microphones of the microphone array 128. The action 804 may comprise, for each of the audio signals $x_1(n)$-$x_N(n)$, estimating future values of the audio signal as a function of previous values of the audio signal to produce a predicted voice signal corresponding respectively to the audio signal. The action 804 may further comprise subtracting each predicted voice signal from its corresponding audio signal to the produce multiple prediction error signals $e_1(n)$-$e_N(n)$. The action 804 may be performed by an array of extraction components such as the extraction components 302 as shown in FIG. 3, for example.

An action 806 comprises analyzing at least one of the prediction error signals $e_1(n)$-$e_N(n)$ to detect first and second audible taps. This may be performed by the tap detection components 308 of the individual FTDs 300, with reference to dynamics and periodicity analyses as already described. An audio double-tap may comprise an adjacent pair of first and second audible taps detected by one of the FTDs 300, such as the audible taps 206 and 208 of FIG. 2. The taps 206 and 208 may be produced from respectively corresponding locations, corresponding to physical positions or coordinates within the environment where two objects interacted or contacted to create the audible tap. The locations of the first and second taps will be referred to herein as first and second locations, although the first and second locations may coincide with each other or represent substantially the same location. Audible taps having locations that are within a threshold proximity or distance from each other are referred to as being commonly located or being in a common location. For example, the threshold proximity may be equal to five inches, so that audible taps produced at locations within five inches of each other may be considered to be commonly located. In some cases, the threshold proximity may be set to a smaller value to ensure that the two taps of a double tap are more closely constrained to occurring from within a small distance of each other. This might be useful, for example, to ensure that the first and second taps are produced by the same physical elements, such as a single hand and a single location on a hard surface. In other cases, the threshold proximity may be set to a larger value to allow more variation in methods of producing double taps. For example, a larger threshold proximity may allow the first and second taps to be produced with two hands.

The action 806 is repeated if no double-tap is detected in order to continuously monitor the received audio signals for double-tap events.

Actions 808 and 810 are performed in response to detecting a double-tap event. The action 808 comprises calculating a first set of time-difference-of-arrival (TDOA) values 812 corresponding to the first tap 206(*a*), based at least in part on the portions 208(*a*) of the audio signals corresponding in time to the first audible tap 206(*a*). The action 810 comprises calculating a second set of time-difference-of-arrival values 814 corresponding to the second audible tap 206(*b*), based at least in part on the portions 208(*b*) of the audio signals corresponding in time to the second audible tap 208(*b*). Time-difference-of-arrival values may also be referred to herein as time-of-arrival differences or TDOA values.

Each TDOA value indicates the difference in the times that a given signal arrives at two different microphones. With respect to the first tap 206(*a*), a single TDOA value indicates the difference in arrival time of the first pulse 208(*a*) at two different microphones. The first set of TDOA values includes an individual TDOA value corresponding to each available combination of two microphones. In the case of three microphones A, B, and C, for example, a set of TDOA values may include an individual TDOA value for each of the following combinations of microphones: AB, AC, and BA. In the case of four microphones A, B, C, and D, a set of TDOA values may include an individual TDOA value for each the following combinations of microphones: AB, AC, AD, BC, BD, and CD.

Thus, the first set 812 of TDOA values includes an individual TDOA value corresponding to each available combination of the microphones 128, where each TDOA value indicates the difference in arrival time of the first pulse 208(*a*) at two different microphones. The second set 814 of TDOA values similarly includes an individual TDOA value corresponding to each available combination of the microphones 128, where each TDOA value indicates the difference in arrival time of the second pulse 208(*b*) at two different microphones.

An action 816 is then performed, based at least in part on the first and second sets of TDOA values 812 and 814. The action 816 comprises determining the proximity of the locations of the first and second taps 206(*a*) and 206(*b*). More specifically, the action 816 may comprise calculating or otherwise determining a proximity parameter 818, based at least in part on the first and second sets of TDOA values 812 and 814. The proximity parameter 818 indicates information about the proximity of the locations of the first and second taps 206(*a*) and 206(*b*).

Various techniques are available for calculating or estimating TDOA values between different signals, many of which utilize cross-correlation techniques. As mentioned above, time delays between an audible tap arriving at different microphones may be estimated by cross-correlating the prediction error signals $e_1(n)$-$e_N(n)$ or by phase transform approaches based on the prediction error signals $e_1(n)$-$e_N(n)$. Based on the time delays, sound source localization with respect to a detected audible tap can be performed by spherical interpolation or Brandstein-Adcock-Silverman algorithms.

An action 820 may comprise determining whether to validate the detected audio double-tap based at least in part on whether the first and second audible taps were produced from a common location. The action 820 may comprise, for example, comparing the proximity parameter 818 to a threshold to determine whether the first and second audible taps are proximate to each other, and to validate or invalidate the detected double-tap in response to the comparison. The action 822 of validating the double-tap and performing a corresponding action may be performed when the proximity parameter is less than the threshold, indicating close proximity or substantial colocation of the first and second taps 206(*a*) and 206(*b*). The action 824 of invalidating the double-tap may be performed when the proximity parameter is greater than the threshold, indicating that the first and second taps 206(*a*) and 206(*b*) are not colocated. The action that otherwise would be performed in response to a double-tab is not performed if the proximity parameter is greater than the threshold.

In certain embodiments, the action 816 may comprise calculating position coordinates indicating locations of the first and second audible taps in one, two, or three dimensions. More specifically, the action 816 may comprise (a) calculating one or more first coordinates corresponding to the location of the first audible tap, based at least in part on the first set 812 of TDOA values; (b) calculating one or more second coordinates corresponding to the location of the second audible tap based at least in part on the second set of TDOA values; and (c) calculating the proximity parameter 818 based at least in part on differences between the one or more first coordinates and the one or more second coordinates.

In other embodiments, the action 816 may be accomplished within determining coordinates of the first and second audible taps. For example, the TDOA values may be compared to each other apart from position calculations to determine the proximity parameter.

The described audible tap detection techniques may be used by the ARFN 102 to evaluate actions of a person, and to receive instructions or commands from a person. These or similar techniques may be used in conjunction with many different types of devices, such as general-purpose computers, game systems, industrial systems, and so forth. The described techniques may also be adapted to identify and validate different numbers of sequential taps, in which the taps potentially have a varying rhythm or cadence.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   receiving an audio signal from a microphone;
   determining a portion of the audio signal corresponding to speech;
   determining a prediction error signal that excludes the portion corresponding to the speech;
   analyzing the prediction error signal to detect a first audible tap that occurred from a first location and a second audible tap that occurred from a second location;
   identifying a portion of the prediction error signal that corresponds in time to the first audible tap;
   identifying a portion of the prediction error signal that corresponds in time to the second audible tap;
   calculating a first time-difference-of-arrival (TDOA) value based at least in part on the portion of the prediction error signal corresponding in time to the first audible tap;
   calculating a second TDOA value based at least in part on the portion of the prediction error signal corresponding in time to the second audible tap;
   determining that the first location and the second location are a common location based at least in part on the first TDOA value and the second TDOA value;
   determining that the first audible tap and the second audible tap occurred within a predefined time period;
   determining an audio double-tap has occurred based at least in part on (a) the first audible tap and the second audible tap originating from the common location and (b) the first audible tap and the second audible tap occurring within the predefined time period; and
   causing a computing device to execute a command based at least in part on determining that the audio double-tap has occurred.

2. The method of claim 1, wherein determining that the first location and the second location are a common location comprises:
   analyzing the first TDOA value to determine the first location; and
   analyzing the second TDOA value to determine the second location.

3. The method of claim 1, wherein determining that the first audible tap and the second audible tap occurred from a common location comprises calculating a distance between the first location and the second location based at least in part on the first TDOA value and the second TDOA value.

4. The method of claim 1, wherein the analyzing comprises:
   determining an envelope value of the prediction error signal, wherein the envelope value comprises a smoothed amplitude boundary of the prediction error signal;
   determining a floor value of the prediction error signal, wherein the floor value comprises a smoothed average amplitude of the prediction error signal;
   analyzing the envelope value with respect to the floor value to determine a dynamic range;
   determining a periodicity; and
   determining an occurrence of at least one of the first audible tap or the second audible tap when the dynamic range is greater than a first threshold and the periodicity is less than a second threshold.

5. A method comprising:
   receiving an audio signal from a microphone;
   determining a portion of the audio signal corresponding to speech;
   determining a prediction error signal that excludes the portion corresponding to the speech;
   determining a dynamic range of the prediction error signal;
   determining a periodicity of the prediction error signal;
   determining, by a processor, an occurrence of an audible tap based at least in part on the dynamic range being greater than a first threshold and the periodicity being less than a second threshold; and
   causing a computing device to execute a command based at least in part on determining the occurrence of the audible tap.

6. The method of claim 5, wherein determining the portion of the audio signal corresponding to the speech comprises performing linear predictive coding.

7. The method of claim 5, further comprising processing the audio signal to reduce stationary noise in the audio signal.

8. The method of claim 5, wherein determining the dynamic range comprises:
   determining an envelope value of the prediction error signal, wherein the envelope value comprises a smoothed amplitude boundary of the prediction error signal;
   determining a floor value of the prediction error signal, wherein the floor value comprises a smoothed average amplitude of the prediction error signal; and
   analyzing the envelope value with respect to the floor value.

9. The method of claim 5, wherein determining the periodicity comprises auto-correlating signal values related to the prediction error signal.

10. The method of claim 5, wherein determining the dynamic range comprises using a first sample rate and determining the periodicity comprises using a second sample rate that is lower than the first sample rate.

11. The method of claim 5, wherein determining occurrence of the audible tap is based at least in part on determining that the audible tap originated more than a predefined distance from the microphone.

12. The method of claim 5, further comprising:
calculating a time-difference-of-arrival (TDOA) value based at least in part on the prediction error signal; and
analyzing the TDOA value to determine an originating location of the audible tap.

13. The method of claim 5, wherein the audio signal is based on at least one of audible audio or ultrasonic audio.

14. A method comprising:
receiving an audio signal;
determining a portion of the audio signal corresponding to speech;
determining, by one or more processors, a prediction error signal via linear predictive coding, the prediction error signal excluding the portion corresponding to the speech;
determining, by the one or more processors, an occurrence of an audible tap based at least in part on analyzing the prediction error signal; and
causing a computing device to execute a command based at least in part on determining the occurrence of the audible tap.

15. The method of claim 14, wherein determining the portion of the audio signal corresponding to the speech comprises performing linear predictive coding.

16. The method of claim 14, wherein analyzing the prediction error signal comprises:
determining an envelope value of the prediction error signal, wherein the envelope value comprises a smoothed amplitude boundary of the prediction error signal;
determining a floor value of the prediction error signal, wherein the floor value comprises a smoothed average amplitude of the prediction error signal;
analyzing the envelope value with respect to the floor value to determine a dynamic range of the prediction error signal; and
determining a periodicity of the prediction error signal.

17. The method of claim 16, wherein determining the periodicity comprises auto-correlating signal values related to the prediction error signal.

18. The method of claim 16, wherein determining the occurrence of the audible tap is based at least in part on the dynamic range being greater than a first threshold and the periodicity being less than a second threshold.

19. The method of claim 14, further comprising:
processing the audio signal to produce a down-sampled audio signal;
determining a portion of the down-sampled audio signal corresponding to the speech;
determining a second prediction error signal that excludes the portion of the down-sampled audio signal corresponding to the speech; and
wherein determining the occurrence of the audible tap is further based at least in part on analyzing the second prediction error signal.

20. The method of claim 14, further comprising:
processing the audio signal to produce a down-sampled audio signal;
determining a portion of the down-sampled audio signal corresponding to the speech;
determining a second prediction error signal that excludes the portion of the down-sampled audio signal corresponding to the speech;
determining an envelope value of the second prediction error signal, wherein the envelope value comprises a smoothed amplitude boundary of the second prediction error signal;
determining a floor value of the second prediction error signal, wherein the floor value comprises a smoothed average amplitude of the second prediction error signal;
analyzing the envelope value with respect to the floor value to determine a dynamic range of the second prediction error signal;
determining a periodicity of the second prediction error signal; and
wherein determining the occurrence of the audible tap is based at least in part on determining that the dynamic range is greater than a first threshold and the periodicity is less than a second threshold.

21. The method of claim 14, further comprising:
calculating a time-difference-of-arrival (TDOA) value based at least in part on the prediction error signal; and
analyzing the TDOA value to determine an originating location of the audible tap.

* * * * *